(12) United States Patent
Ait-Kadi et al.

(10) Patent No.: US 6,359,033 B1
(45) Date of Patent: Mar. 19, 2002

(54) STABLE PAVING COMPOSITIONS HAVING IMPROVED LOW AND HIGH TEMPERATURE PROPERTIES

(75) Inventors: Abdellatif Ait-Kadi, Quebec (CA); Ali Akbar Yousefi, Tehran (IR)

(73) Assignee: Universite Laval, Cite Universitaire, Quebec (CA)

( * ) Notice: Subject to any disclaimer, the term of this patent is extended or adjusted under 35 U.S.C. 154(b) by 0 days.

(21) Appl. No.: 09/618,053

(22) Filed: Jul. 17, 2000

Related U.S. Application Data

(60) Provisional application No. 60/144,365, filed on Jul. 16, 1999.

(51) Int. Cl.$^7$ .............................. C08K 5/01; C08K 3/34
(52) U.S. Cl. ........................ 523/205; 524/62; 524/70; 524/71; 524/424; 524/447; 524/492
(58) Field of Search ........................... 523/205; 524/62, 524/424, 447, 492, 70, 71

(56) References Cited

U.S. PATENT DOCUMENTS

| | | | | |
|---|---|---|---|---|
| 2,038,023 A | * | 4/1936 | Craig et al. ................... | 106/31 |
| 3,790,519 A | * | 2/1974 | Wahlborg ............ | 260/28.5 AS |
| 3,855,167 A | * | 12/1974 | Bowman ..................... | 260/28 |
| 4,003,866 A | * | 1/1977 | Paturle .................. | 260/17.4 R |
| 4,028,293 A | * | 6/1977 | van den Berg ...... | 260/28.5 AS |
| 4,196,013 A | * | 4/1980 | Dannenberg et al. ... | 106/281 R |
| 4,532,271 A | * | 7/1985 | Kai et al. ................... | 523/208 |
| 4,908,064 A | * | 3/1990 | Plummer ................. | 106/281.1 |
| 5,704,971 A | * | 1/1998 | Memon ................... | 106/281.1 |
| 5,708,061 A | * | 1/1998 | Hesp et al. ................... | 524/59 |

* cited by examiner

*Primary Examiner*—Kriellion A. Sanders
(74) *Attorney, Agent, or Firm*—Shanks & Herbert

(57) ABSTRACT

A paving composition comprises a mixture of about 90 to 99.5 wt. % of an asphaltic material and about 0.5 to 10 wt. % of solid particles each encapsulated with a cross-linked polymer, the encapsulated particles being uniformly dispersed in the asphaltic material. The encapsulated particles have a particle-to-polymer weight ratio so as to provide a density match between the encapsulated particles and the asphaltic material. The paving composition according to the invention has a higher complex viscosity at high temperatures (60° C.) and is more ductile at low temperatures (−15° C.) in comparison with the base asphaltic material. Moreover, the composition is completely stable at elevated temperatures (160° C.) or during long periods of storage.

15 Claims, 8 Drawing Sheets

STABLE PAVING COMPOSITIONS HAVING IMPROVED LOW AND HIGH TEMPERATURE PROPERTIES

This application claims benefit of 60/144,365 filed Jul. 16, 1999.

BACKGROUND OF THE INVENTION

The present invention relates to stable paving compositions having improved low and high temperature properties. More particularly, the invention is concerned with mixtures of an asphaltic material and solid particles encapsulated with a cross-linked polymer, the encapsulated particles being uniformly dispersed in the asphaltic material.

Mixtures of polymers and solid particles in asphalt are always subjected to destabilizing forces such as gravity force and attraction forces between the dispersed particles. High molecular weight polymers are never completely soluble in asphalt, resulting in the formation of a polymer dispersed phase. The coalescence of fine particles followed by creaming is the main mechanism that is favored by decreasing surface energy of polymer particles and gravity force. The final result is formation of a thin layer of polymer on the top of the asphalt. Reducing the size of polymer particles is a remedy to extensively decrease the rate of coalescence, but creaming and Brownian motion still exist and can cause coalescence of up going polymer particles. The concept of steric stabilization is very limited to finding a completely soluble polymer in asphalt ingredients and reactive chemical functional groups in asphalt.

Carbon black has already been used as a modifier for paving grade asphalt. However, suspension of high density particles in asphalt undergo precipitation during long periods of storage at elevated temperatures (160° C.).

SUMMARY OF THE INVENTION

It is therefore an object of the present invention to overcome the above drawbacks and to provide stable paving compositions which comprise mixtures of an asphaltic material and solid particles, and which exhibit no phase separation between the solid particles and the asphalting material at elevated temperatures or during long periods of storage.

According to the invention, there is provided a paving composition comprising a mixture of about 90 to 99.5 wt. % of an asphaltic material and about 0.5 to 10 wt. % of solid particles each encapsulated with a cross-linked polymer, the encapsulated particles being uniformly dispersed in the asphaltic material. The encapsulated particles have a particle-to-polymer weight ratio so as to provide a density match between the encapsulated particles and the asphaltic material.

Applicant has found quite unexpectedly that by controlling the weight ratio of the solid particles to the polymer encapsulating same so that the density of the encapsulated particles is approximately equal to the density of the asphaltic material, there is no phase separation between the encapsulated particles and the asphaltic material at elevated temperatures and/or during long periods of storage. There is also no separation between the solid particles and the polymer encapsulating same due to the cross-linking of the polymer. Care should be taken to avoid exceeding about 10 wt. % of polymer since above such a concentration there is a phase inversion as the polymer swells and the asphaltic material becomes dispersed in the swollen polymer.

According to a preferred embodiment, the asphaltic material and encapsulated particles are present in amounts of about 95–97 wt. % and about 3–5 wt. %, respectively. Preferably, the weight ratio of the solid particles to the polymer is about 3:1.

Examples of suitable solid particles which may be used include fine powders of carbon black, silicate or kaolin. Carbon black having a particle size of about $10\mu$ is preferred.

Examples of suitable polymers which may be used for encapsulating the solid particles include polyolefins such as polyethylene, polypropylene and polystyrene, and polydienes such as polybutadiene and polyisoprene.

The term "asphaltic material" as used herein is meant to include petroleum asphalts, also called oil asphalts, such as:
1) straight-reduced asphalt by:
   a) atmospheric, vacuum or partial-vacuum distillation,
   b) solvent precipitation;
2) thermal asphalts, such as residues form cracking operations in petroleum stocks; and
3) air-blown asphalts:
   a) straight-blown without catalysts,
   b) blown in the presence of catalysts.

According to a particularly preferred embodiment, the encapsulated particles are obtained by catalytically grafting the polymer on the solid particles. Preferably, the polymer is catalytically synthesized on the surface of the particles and the encapsulated particles are treated with a cross-linking agent to cause cross-linking of the polymer. Examples of suitable cross-linking agents include peroxides such as dicumyl peroxide.

The paving compositions according to the invention have a higher complex viscosity at high temperatures (60° C.) and are more ductile at low temperatures (−15° C.) in comparison with the base (unmodified) asphaltic material. Moreover, the compositions are completely stable at elevated temperatures (160° C.) or during long periods of storage.

BRIEF DESCRIPTION OF THE DRAWINGS

The following non-limiting examples illustrate the invention, reference being made to the accompanying drawings, in which.

DESCRIPTION OF PREFERRED EMBODIMENTS

EXAMPLE 1

Figure 1:
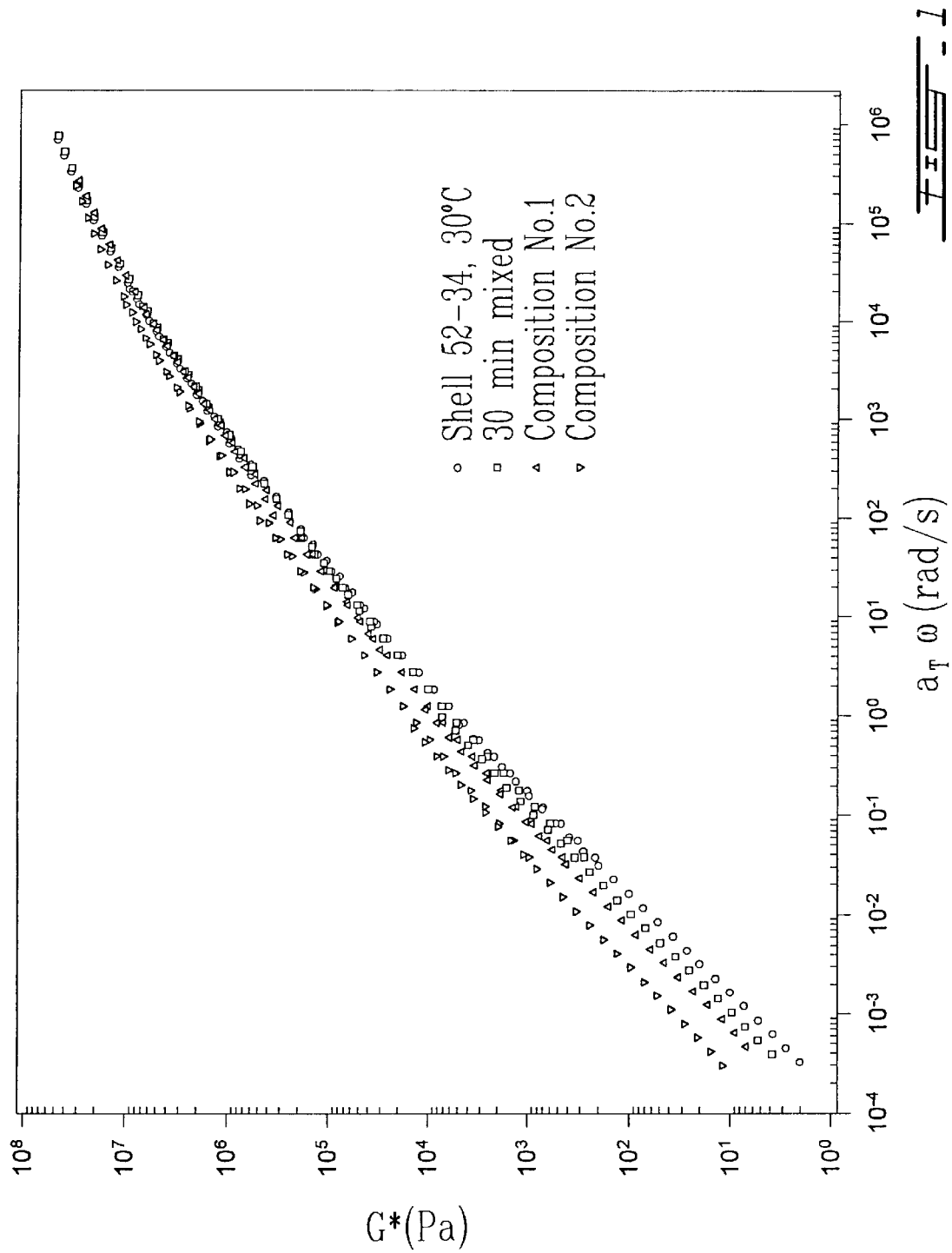
FIG. 1 is a graph illustrating the variation of the complex modulus as a function of $a_T\omega$, where $\omega$ is the oscillation frequency and $a_T$ the horizontal translation factor, for the base asphaltic material and composition Nos. 1 and 2 described in examples 1 and 2, at a reference temperature of 30° C.

The catalytic grafting of high density polyethylene on commercial carbon black particles was carried out in a reactor. In a first step, a known predetermined amount of carbon black powder was weighed and placed into the reactor. This step was followed by placing the reactor under vacuum at 110°C. over night to exclude water and air from the reactor and carbon black powder. In a second step, the temperature was lowered to 60° C. and two liters of freshly distilled hexane were added to the reactor via a tube while the flask was under nitrogen gas current. The powder was put into suspension state by mixing. After 5 minutes, a predetermined volume of catalyst consisting of $TiCl_4$ was injected into the reactor by means of a syringe. The air and moisture in the syringe were excluded by filling the syringe with nitrogen gas. The catalyst was fixed on the surface of the carbon black while maintaining mixing at 60° C. for one hour. In a next step, excessive catalyst was washed out by vacuum and two additions of one liter distilled hexane under a constant nitrogen gas current. At the end, three liters of distilled hexane were added to the reactor and mixed for 5 minutes. Then, a predetermined volume of co-catalyst consisting of $AlEt_3$ was injected into the reactor and was left for 5 minutes under mixing at 60° C. in order to form a complex of catalyst and co-catalyst. Thereafter, ethylene gas was purged into the reactor for 20 minutes. A white layer of polyethylene was observed on the surface of the carbon black particles. After completion of the reaction, the reaction was stopped by the addition of ethyl alcohol and finally plenty of water. The final product was taken out of the reactor, filtered, washed and dried at 60° C. under vacuum.

The carbon black particles encapsulated with polyethylene thus obtained were impregnated with a 10 wt. % solution of dicumyl peroxide in dichloromethane for 2 hours at 50° C. The resulting polyethylene grafted carbon black was then filtered on a filter paper and dried under vacuum. According to repeated measurements, there was about 50 wt. % of polyethylene grafted on the particles. After adding the solution of dicumyl peroxide, some grafted polyethylene dissolved in the dicloromethane. According to measurement, the percentage of polyethylene on the carbon black particles reduced to about 33 wt. %, representing a particle-to-polymer weight ratio of 3:1, and the composite particles contained about 3 wt. % dicumyl peroxide.

As base asphaltic material, a 52-34 performance grade asphalt from Shell Company was used; such an asphaltic material is hereinafter referred to as "Shell 52-34". About 3 wt. % of the polyethylene grafted carbon black particles containing dicumyl peroxide absorbed therein were added to about 97 wt. % of Shell 52-34 at 160° C. under stirring and mixing was maintained for 30 minutes to crosslink the polyethylene encapsulating the particles and to uniformly disperse the encapsulated particles into the asphaltic material, thereby obtaining a paving composition which is hereinafter referred to as "composition No. 1".

The density of the above encapsulated particles at 160° C. is about 1.26, whereas the density of the Shell 52-34 utilized is about 1.01 at 160° C. However, since the components present in the asphaltic material cause the polyethylene encapsulating the particles to undergo swelling, the density of the encapsulated particles in the Shell 52-34 reduces and becomes substantially equal to that of the asphaltic material, thereby ensuring stability of the composition.

EXAMPLE 2

Example 1 was repeated with the exception that about 5 wt. % of the polyethylene grafted carbon black particles containing dicumyl peroxide absorbed therein were added to about 95 wt. % of Shell 52-34, to obtain a paving composition which is hereinafter referred to as "composition No. 2".

Characterization

Dynamic measurements were carried out on a Bohlin CVO mechanical rheometer (stress controlled rheometer) using different parallel plates of 10, 15 and 40 mm diameter. Test temperatures varied from −15 to 60° C. The tests were performed at frequencies ranging from 0.002 to 125 rad/s. Stress sweep tests were first carried out to ensure that the rate sweep tests are performed in the linear viscoelastic zone. For the strategic highway research program (SBRP) tests, the same rheometer was used in temperature sweep mode in 50 to 90° C. temperature range at 10 rad/s. Creep tests were also carried out at 60° C. on the same rheometer. In this test, a stress (100 Pa) was applied on the sample for one minute, then the stress was removed and the recovery of the deformation was monitored.

Figure 2:
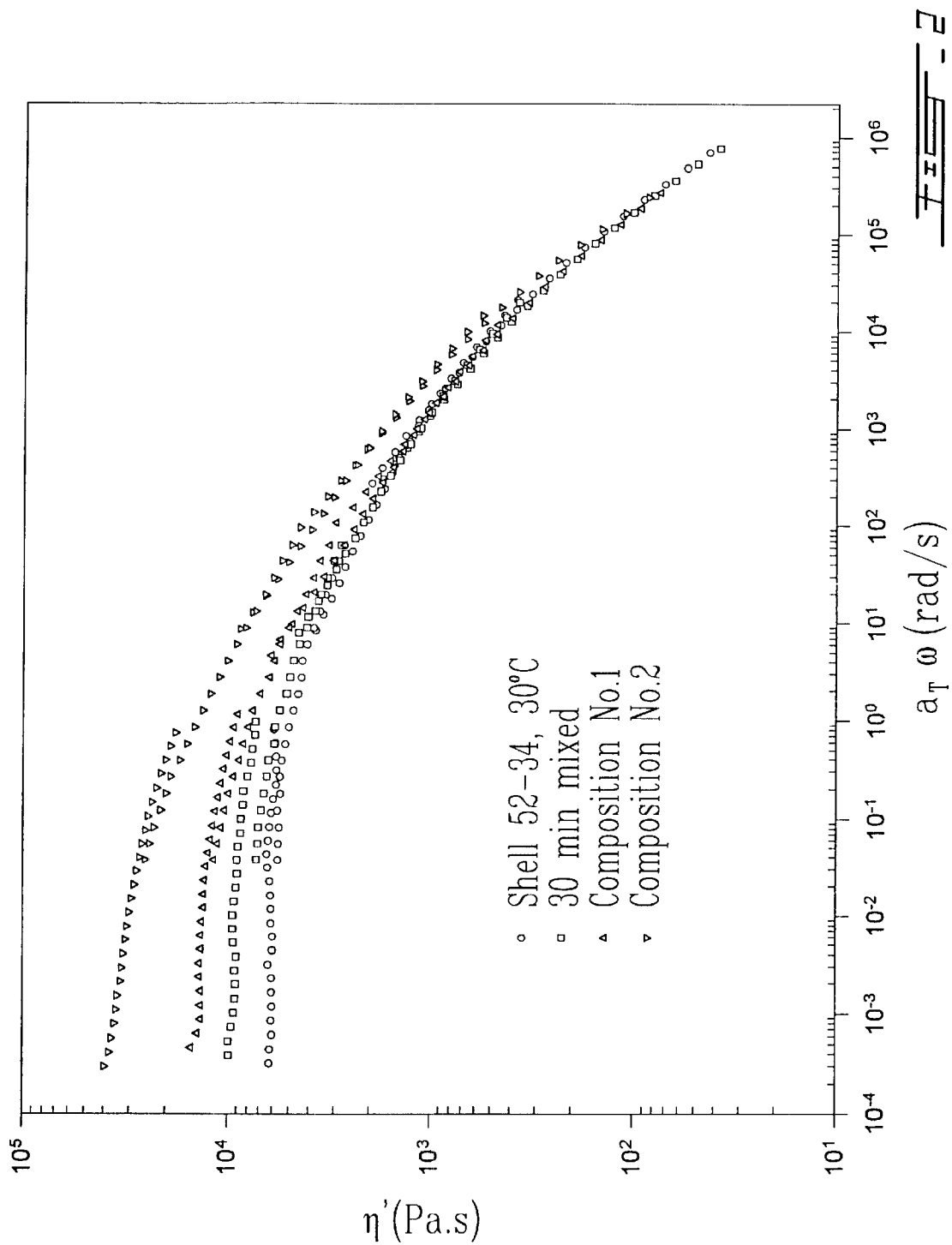
FIG. 2 is a graph illustrating the variation of the dynamic viscosity as a function of $a_T\omega$, where $\omega$ is the oscillation frequency and $a_T$ the horizontal translation factor, for the modified asphaltic material and composition Nos. 1 and 2 described in examples 1 and 2, at a reference temperature of 30° C.

The results of rheological measurements of composition Nos. 1 and 2 are reported in FIGS. 1 and 2. The experimental frequency window was extended using the time-temperature superposition (TTS) principle. The results of FIG. 2 show that in this representation, the TTS fairly holds even though some discrepancy can be observed between the data sets obtained at 9 different temperatures. Whereas G' and G" curves superpose for the low temperature (−15, 0 and 30° C.), it is not possible to have a good superposition for 60° C. curves. This is because asphalt is always melting in the range of experimental temperatures. This gives rise to involvement of energetically and entropically induced relaxations that interfere with the other relaxations. Generally, any materials which changes chemically or physically during rheological measurements will not obey TTS. As a mater of fact, to superpose all curves properly one needs different shift factors which corresponds to the failure of TTS for asphalt. The difficulty of superposing rheological curves at different temperatures is more evident in dynamic viscosity (η') master curves of composition Nos. 1 and 2 shown in FIG. 2. Regardless of invalidity of TTS, the master curves of the complex modulus of composition Nos. 1 and 2 are compared with the original Shell 52-34 and a blank sample mixed for 30 minutes under the same conditions in FIG. 1. The well-known shift factors obtained for G' and G" master curves are reported in Table-I.

TABLE 1

Shift factors of modified and non-modified asphalt.

| | Shell 52-34 | 30 min. mixed | Composition No. 1 | Composition No. 2 |
| --- | --- | --- | --- | --- |
| −15° C. | 11000 | 12000 | 4250 | 3790 |
| 0° C. | 335 | 315 | 185 | 230 |
| 30° C. | 1 | 1 | 1 | 1 |
| 60° C. | 0.01297 | 0.01688 | 0.0185 | 0.01195 |

As seen, the shift factors obtained for the composition Nos. 1 and 2 represent lesser displacements of the original curves to be superposed on the reference temperature curve (30° C.). This is of significant importance if an asphalt can retain its original form and structure over a wide range of temperature. This will directly reduce the pavement failures. As seen, the blank asphalt (30 minutes mixed) is of a larger viscosity than that of the original binder. This simply results from lost of some volatiles during mixing as witnessed by an increase in the n-pentane insoluble parts of the asphalt (asphaltenes). This quantity rises from 20.72% for the original asphalt to 21.61% for the blank. It is apparent from FIGS. 1 and 2 that composition Nos. 1 and 2 tend to behave differently in low and high frequency regions. At low frequencies, they show larger complex modulus and viscosity. This range of frequency corresponds to high temperatures at which asphalt needs higher elasticity and viscosity at these temperatures. As seen, mixing asphalt for 30 min. at 160° C. without adding any modifier increases these properties of the base asphalt. Therefore, the modified asphalts represented by composition Nos. 1 and 2 cannot be compared with the original asphalt. This is why the modified asphalts were compared with 30 minutes mixed asphalt (blank). Addition of the 3 and 5% of polyethylene grafted carbon blacks results in pronounced increases of the rheological properties of the base asphalt at high and moderate temperatures. In high frequency region (corresponding to low temperatures), the modified asphalts show a tendency to have lower viscosity and complex modulus in comparison with those of the base and 30 minutes mixed asphalt. This is a very important observation which can represent some improvements in the low temperature properties, such as crack resistance, of the modified asphalts.

Figure 3:
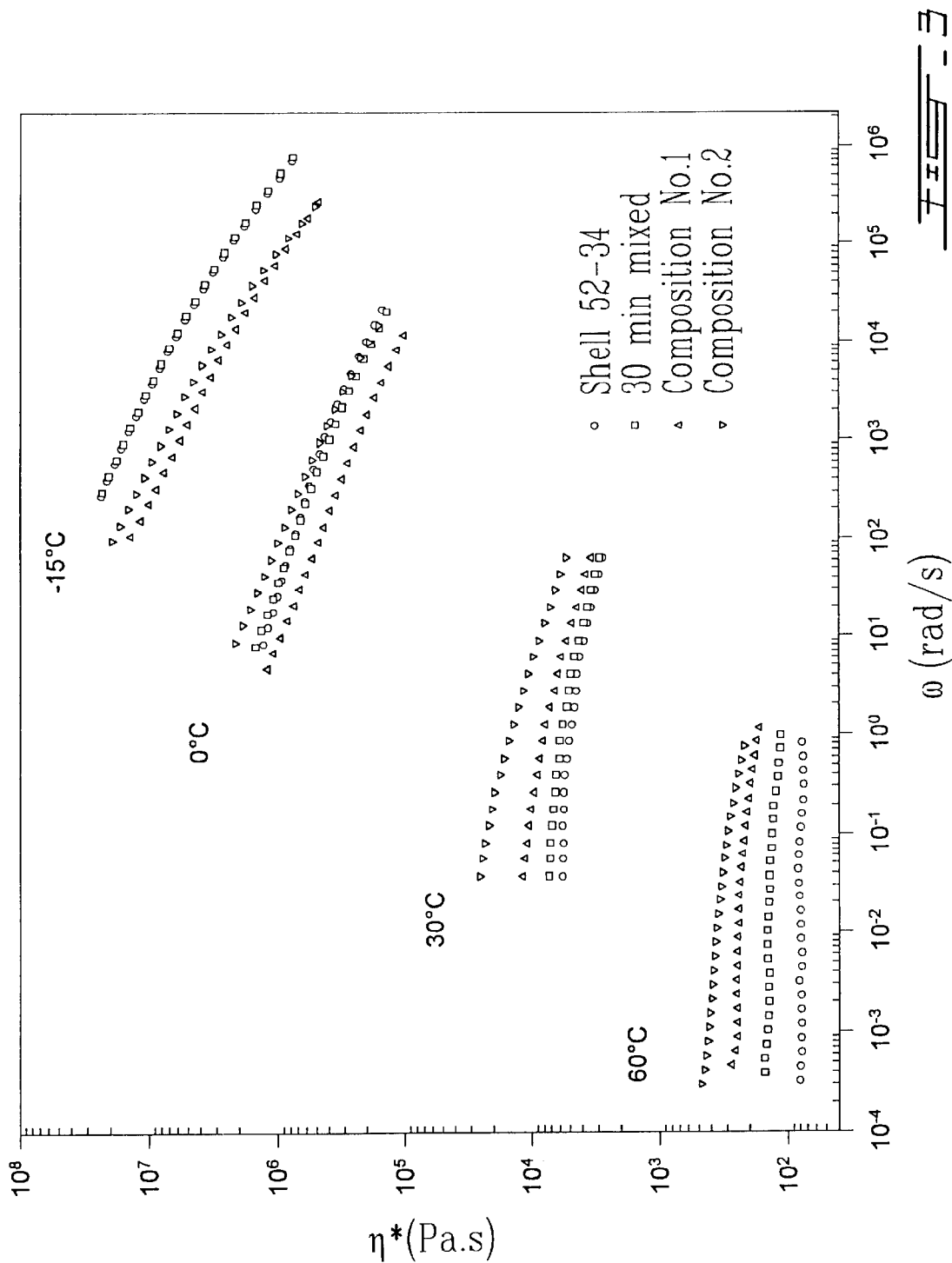
FIG. 3 is a graph illustrating the variation of the dynamic complex viscosity as a function of oscillation frequency for the base asphaltic material and composition Nos. 1 and 2 described in examples 1 and 2, at different temperatures.

To avoid any errors resulted from TTS invalidity, it is of worth comparing the original rheological curves the asphalts at experimental temperatures (FIG. 3). At 30° C., the original asphalt and mixed asphalt are not very different from each other, whereas the modified asphalts represented by composition Nos. 1 and 2 are of larger viscosity than that of both of the non-modified asphalts. At 60° C., the difference between two non-modified asphalts is more observable. This is an expected result because upon heating and mixing asphalt at high temperatures (160° C.) some asphalt constituents evaporate and some other undergo chemical reactions. Consequently, the asphalt possesses higher molecular weights and rheological properties. The difference between the complex viscosity of the two non-modified asphalts can be subtracted from those of modified asphalts to exclude the effect of aging during mixing processes. At this temperature, the modified asphalts again show larger viscosities. An increase in the viscosity at higher temperatures is favorable for the asphalt service properties. At 0° C., it is a different matter. Whereas the non-modified asphalts seem to be superposed, composition No. 1 has a lower complex viscosity and the viscosity curve of composition No. 2 crosses that of the non-modified asphalts. This crossover temperature happens for composition No. 1 somewhere between 0 and 30° C. The crossover temperature can be of vital importance for an asphalt to be accepted as crack and rut resistant asphalt. Down to −15° C., it is observed that the non-modified asphalts are indistinguishable whereas the modified asphalts enlarge the difference between their viscosity and that of the non-modified ones. It is worth noting that whereas the composition No. 2 has a larger viscosity at 0° C., this composition shows a tendency to have a lower viscosity in the high frequency region of −15° C. curve. This is a clear evidence that composition No. 2 will be less viscous than composition No. 1 at lower temperatures and it is more ductile (less elastic and brittle) in cold paving areas.

Figure 4:
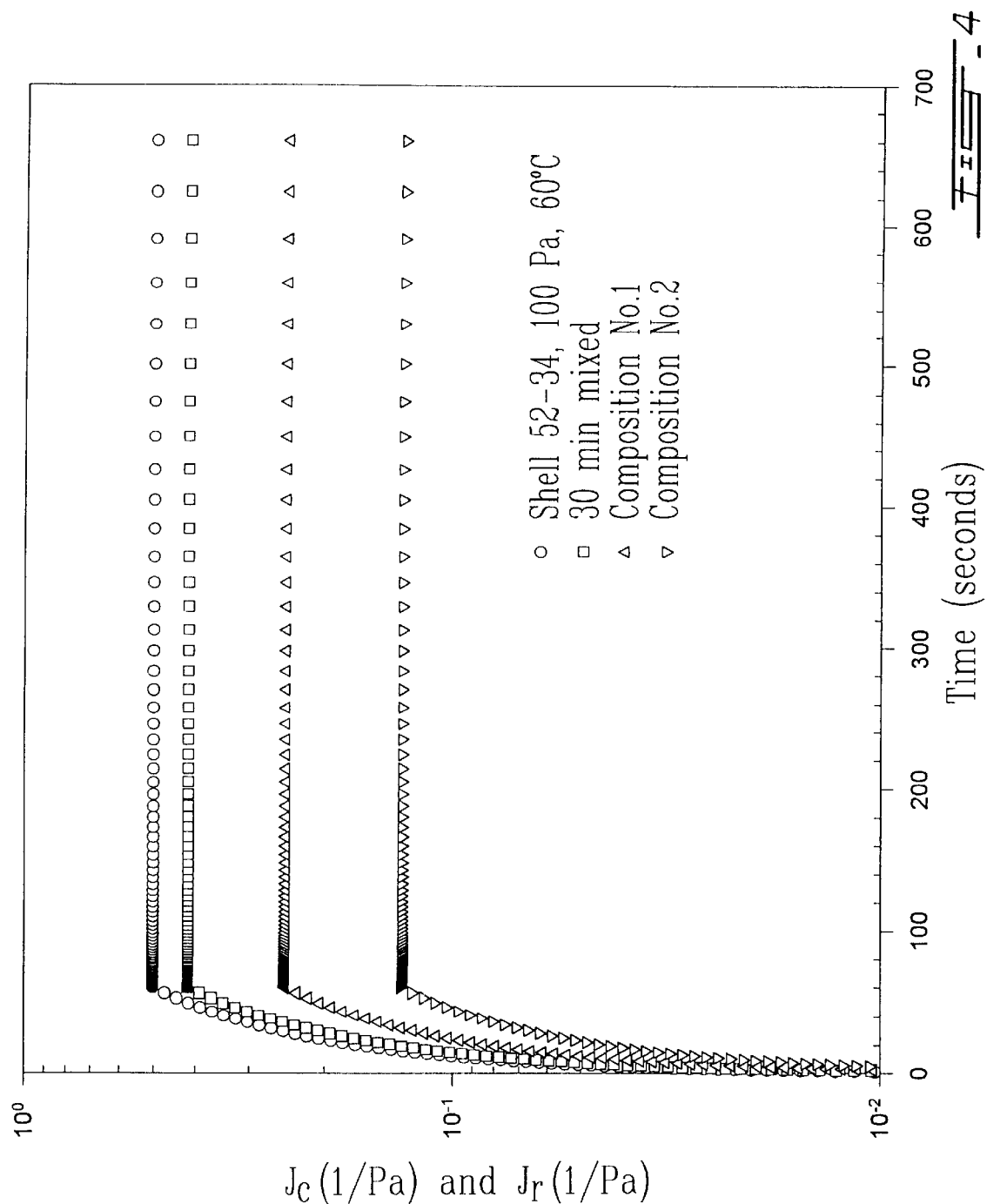
FIG. 4 is a graph illustrating the variation of the creep and recovery compliance as a function of time for the base asphaltic material and composition Nos. 1 and 2, described in examples 1 and 2, at 60° C.

The results of the creep tests at 60° C. performed on composition Nos. 1 and 2, the Shell 52-34 and the 30 min. mixed asphalt are represented in FIG. 4. The results of this test are very important as they can correlate with the rutting resistance of the modified asphalts. As expected, the bitumens do not show any recovery of the imposed deformation but they resist differently against the applied stress (100 Pa). Therefore, it is preferable to only analyze the creep section of the curves. Whereas the base asphalt largely deforms, the 30 minutes mixed asphalt decreases this deformation by 20%. Meanwhile, composition No. 1 reduces the deformation to 50% and composition No. 2 reduces this again to 80% of that of the original asphalt. Whatever happens in the asphalt, the addition of the polyethylene encapsulated carbon black particles results in a decrease in permanent deformation (rutting) of the asphalt.

Figure 5:
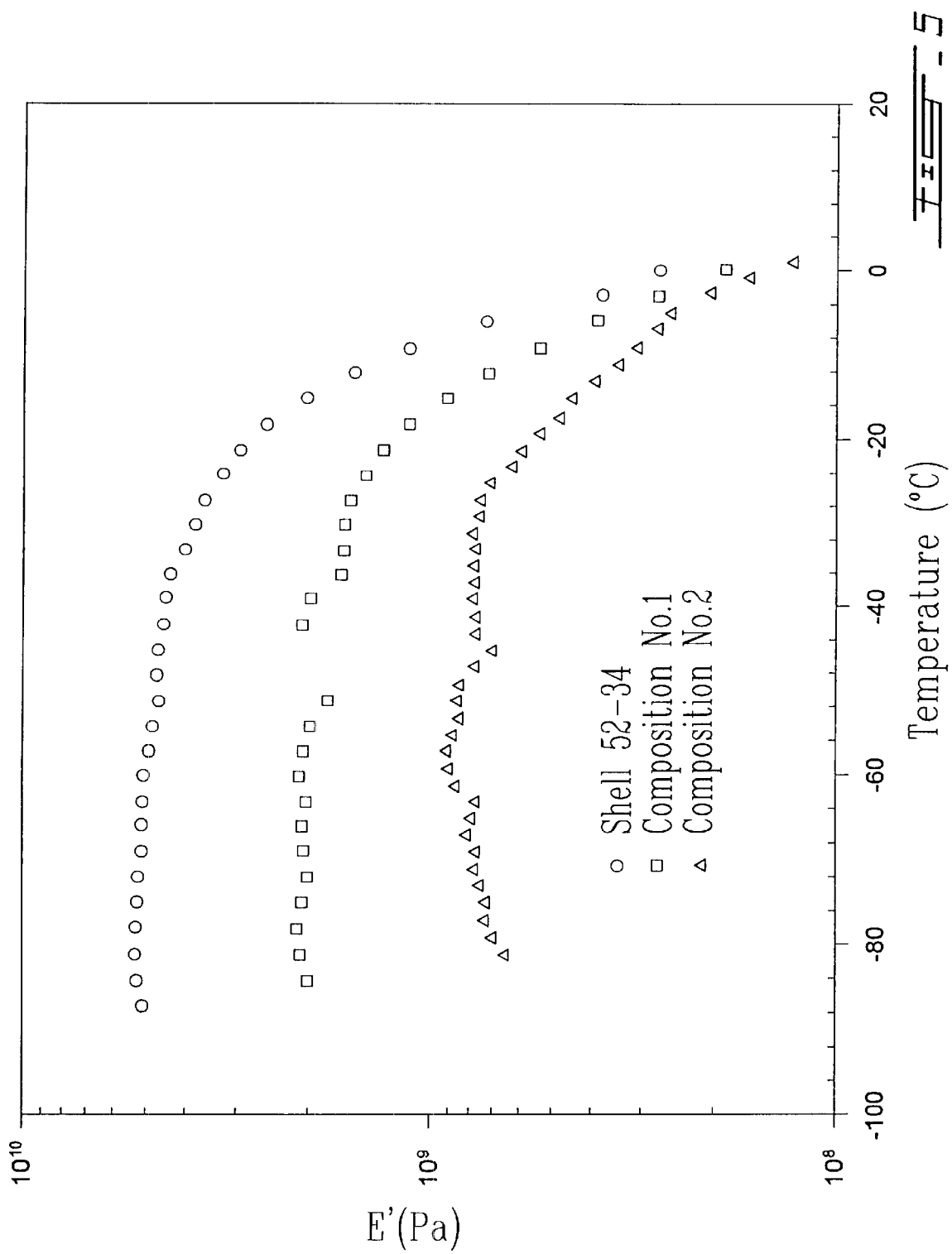
FIG. 5 is a graph illustrating the variation of the elastic modulus as a function of temperature for the base asphaltic material and composition Nos. 1 and 2 described in examples 1 and 2.

It is not possible to go down further in temperature with the Bohlin CVO rheometer to explore behavior of asphalts at low temperatures. This mainly stems from the rheometer temperature limit, the stiffness of the asphalts, the problem of gap setting, appearance of overload and equipment compliance even in the case where very small deformations and geometries are used. The mechanical solid analyzers can replace the rotational rheometer and provide a very good means to study the mechanical properties of asphalt below −30° C. This is very well represented in FIGS. 5 and 6. FIG. 5 compares the elastic modulus (E') of the original asphalt and composition Nos. 1 and 2. Whereas the original asphalt is of an elastic modulus in the order of $5 \times 10^{10}$ Pa and application of even infinitesimal strains (0.01%) is not possible, composition No. 1 has an elastic modulus in the order of $2 \times 10^{10}$ Pa with the same problem of the limitation of using very low deformations. A further decrease in elastic modulus is observed as the concentration of the modifier was raised to 5% (E'=$8 \times 10^8$ Pa). In FIG. 5, it is also clear that the slope of the decrease of the elastic modulus for composition No. 2 is not as sharp as that of the original asphalt and composition No. 1. In the vicinity of 0° C., the modified asphalt starts to show larger elastic modulus than that of the original asphalt. These results are in agreement with those of the rheological measurements.

Figure 6:
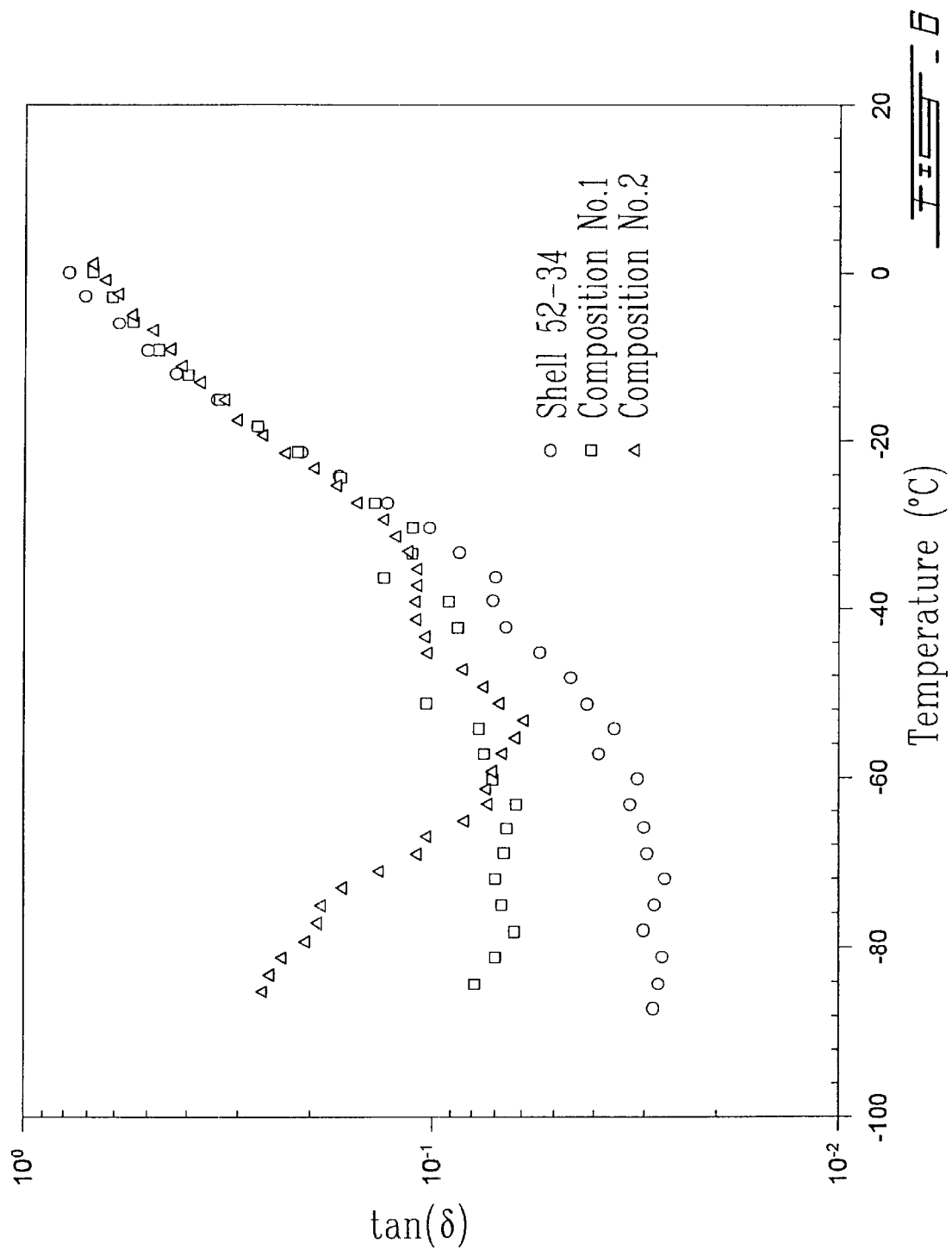
FIG. 6 is a graph illustrating the variation of $\tan(\delta)$ as a function of temperature for the base asphaltic material and composition Nos. 1 and 2 described in examples 1 and 2.

As seen in FIG. 6, the original asphalt starts to show an α-transition around 0° C. and a δ-transition around 40° C. Addition of the modifier results in gradual appearance of γ type transition around −90° C. This transition is not detectable for composition No. 1 whereas it is very well established for composition No. 2. This transition cannot come from the existence of the carbon black particles. This probably is induced by polyethylene particles and their contribution to the mechanisms of energy dissipation when the asphalt matrix is very elastic. Another possibility is displacement of Tg of the PE towards higher temperatures in the presence of asphalt constituents in it.

Conventional asphalt performance tests were performed and included penetration tests carried out at 25° C. according to ASTM D 5–73. The bitumen was thermostated in a water bath and the penetration of a standard needle under a standard load (50 g) was measured during 5 seconds and reported in tenth of mm. The softening point (Ring & Ball test) of different neat and modified asphalts were measured according to ASTM D 36–76. In this test, two disks of bitumen were cast in shouldered rings, then trimmed to remove flash. In the next step, the disks were tested by heating at a constant rate (5° C./min.) in a water bath using a special apparatus. Fraass breaking point tests were performed according to the IP-80 standard. A sample of 0.40±0.01 g of bitumen was weighed on a flat standard steel plaque. The plaque and bitumen sample were gently heated up to form a uniform film of bitumen on the plaque. Then the plaque was put on a flat and horizontal surface to ensure the uniformity of the bitumen film and covered with a watchglass. The test was carried out using the apparatus mentioned in IP-80 at a cooling rate of 1° C. per minute. The Fraass breaking point is defined as the temperature at which a break or a crack appears on the thin layer of asphalt coating the steel plaque. The plaque is subjected to successive flexions under determined cooling conditions.

The results of the above three conventional asphalt performance tests are reported in Table II.

TABLE II

Results of asphalt performance tests.

|  | Shell 52-34 | Blank | Composition No.1 | Composition No. 2 |
|---|---|---|---|---|
| Penetration (25° C., 0.1 mm) | 160 | 104 | 104 | 90 |
| Ring & Ball (° C.) | 41 | 42 | 47 | 57 |
| Fraass (° C.) | −17 | −14 | −17 | −16 |
| $G*/\sin(\delta) > 1$ kpa (° C.) | 55.5 | 56 | 62.4 | 66.7 |

Whereas the penetration tests at 25° C. show the same decrease of penetration for the 30 minutes mixed asphalt and composition No. 1 (104 tenth of mm), for composition No. 2 the penetration at this temperature reduces to 90 (in tenth of mm). This clearly shows the increases in the consistency of the asphalt on the addition of the modifier.

The Ring and Ball test is another test that evaluates the resistance of an asphalt against permanent deformation at high temperatures. The results of this test are reported in Table II for all studied asphalts. The differences between the asphalts are more evident in the results of this test. Whereas the base and 30 minutes mixed asphalts test temperatures are 41 and 42, respectively, those of composition Nos. 1 and 2 are 47 and 57, respectively. This certainly enhances resistance to rutting. The results clearly indicate that this enhanced performance is attributed to the presence of the modifier and not to be the aging experienced by the asphalt matrix during the mixing process at high temperature.

Although it is not an easy task to interpret the results of the Fraass test, an improvement in the results of this test for the modified asphalts is observed. As known, mixing asphalt at high temperatures increases the Fraass breaking temperature of a given asphalt. This is very well demonstrated by a 3 degrees increase of this temperature from the original base asphalt to the 30 minutes mixed asphalt at 160° C. (blank). Although the results of this test are not in agreement with what was found by thermo-mechanical tests, it is of value to compare the modified asphalts with the mixed asphalt to see the positive effects of the modifier on the low temperature properties of the asphalt. 3 and 2 degrees improvement in Fraass breaking point are observed. The inversion of the order may be due either to the experimental errors or originates from the empirical nature of the test.

The results of the specification accepted for the high temperature performance of asphalts are also reported in Table II. Although the base asphalt (Shell 52-34) is supposed to have $G*/\sin(\delta)$ larger than 1 kPa at 52° C., a displacement to 55.5° C. is observed. This is attributed to aging that might occur during the preparation of the samples. This aging process is however the same for all samples and will not affect comparison of the results. Once again, there is no difference between the original asphalt and the 30 minutes mixed (blank) asphalt. This result is consistent with the results of the Ring and Ball test (Table II). Addition of 3 wt. % of polyethylene encapsulated carbon black particles results in 7 degrees and further addition thereof yields an asphalt having $G*/\sin(\delta) \geq 1$ kPa at a temperature eleven degrees higher than that of the original and the blank asphalts.

An emulsion stability test was carried out by transferring a predetermined amount of composition Nos. 1 and 2 into respective glass tubes. Each tube was immediately incubated in an oven at 163±5° C. for 48 hours. The tubes were then taken from the oven and cooled to room temperature, and stored in a freezer. After 24 hours, the tubes were each cut into three equal parts. The upper and lower parts were then melted into separate small cans and labeled as T and B, respectively. Optical microscopy of the two parts was carried out to observe any changes in the concentration of particles in each part.

The stability test for composition No. 1 was carried out at 160° C. for 48 hours. The optical microscope photographs of the modified asphalt and the surface and top and bottom of the stability test tubes showed no trace of polymer release or phase separation of polymer or precipitation of the carbon black particles.

A sample of 5–10 mg of bitumen was heated and slowly pressed between glass slides, then micrographs (using Zeiss FX optical microscope) were taken using a photo camera (35 mm Yashica FX 2000). Scanning Electron Microscopy (SEM) micrographs were obtained by dispersing and gold coating a small quantity of carbon black on the head of the microscope, then viewing using a JEOL, JSM-III SEM.

Figure 7:
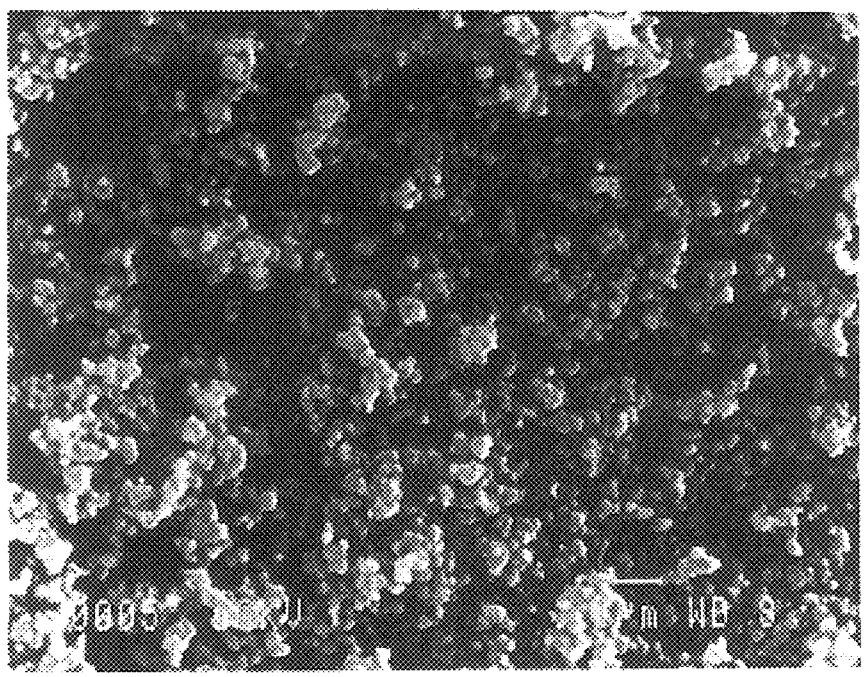
FIG. 7 is a scanning electron micrograph of the original carbon black used in examples 1 and 2.
Figure 8:
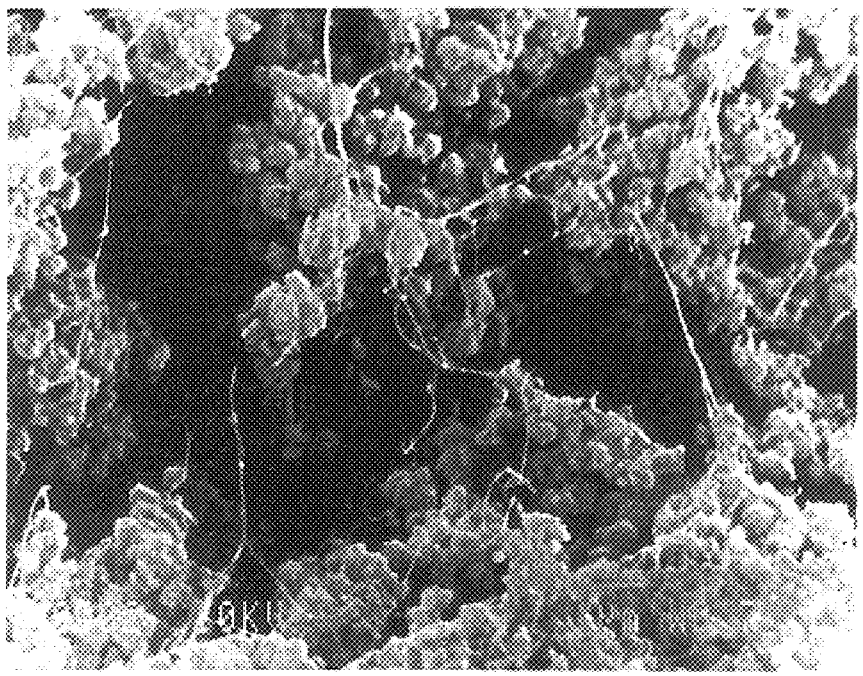
FIG. 8 is a scanning electron micrograph of a 75% polyethylene grafted carbon black.
Figure 9:
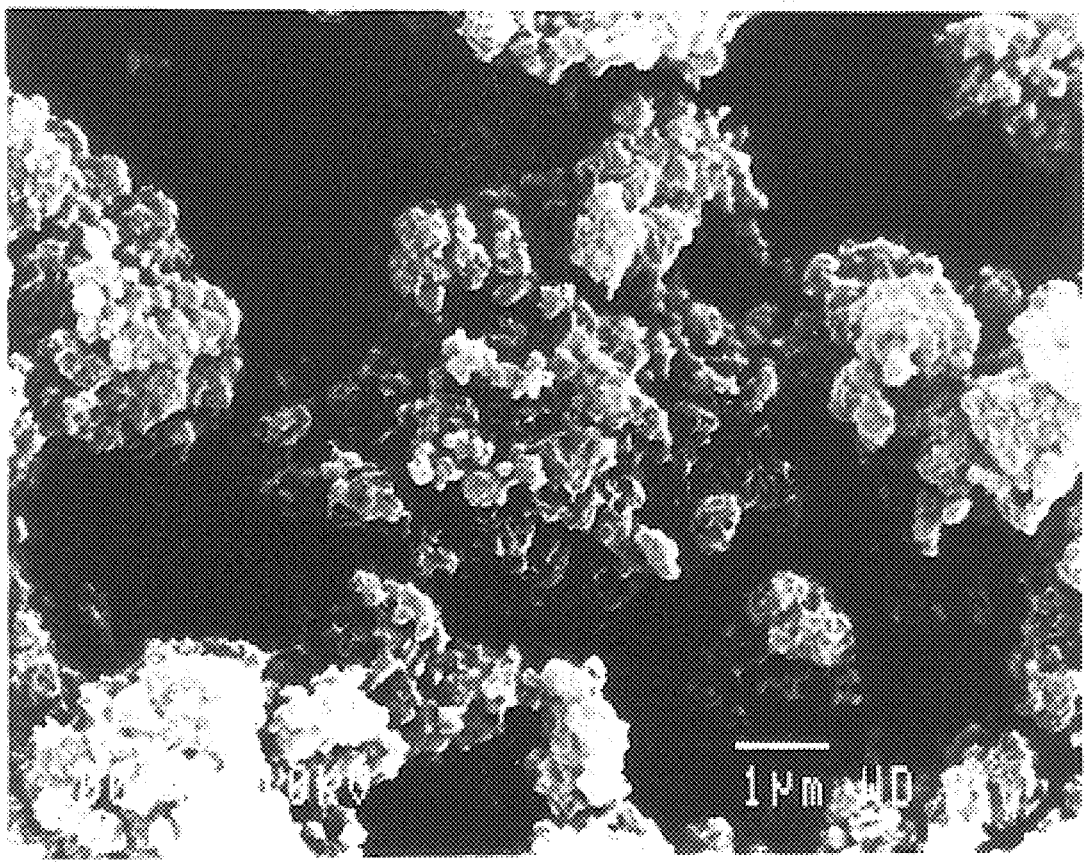
FIG. 9 is a scanning electron micrograph of a 50% polyethylene grafted carbon black.

The SEM micrographs of two different percentages of the polymer on carbon black particles are compared with the original carbon black in FIGS. 7, 8 and 9. At very high polymer concentration (FIG. 8) the polymer bridges the fine solid particles. As seen in the Figures, the polymer and the powder are distinguishable. In FIG. 9, no more polymer bridge is observable, but some polymer encapsulated particles are distinguishable as compared with the original carbon black (FIG. 7). This ensures a complete encapsulation of the solid particles and absence of free polymer in the case of lower percentage of the grafted polymer (50%).

The percentage of the grafted polyethylene on the surface of the carbon black particles was determined using a thermogravimeter from Metller Company (TG 50+TC 11 TA processor). A small sample (10–15 mg) was put into a small crucible and was heated from 40 to 750° C. at a heating rate of 20° C. per minute. The test was repeated three times for each sample. The software is able to calculate the percentage of the weight lost between 150 and 450° C. This corresponds to the polyethylene degradation temperature range.

The test was run on the pure carbon black and synthesized ultra high molecular weight polyethylene to determine the range of temperature in which pure carbon black and polyethylene decompose. According to the repeated measurements on the grafted carbon black, there is about 50 wt. % of polyethylene grafted on the particles. After adding dicumyl peroxide (DCP) some grafted polyethylene are dissolved in dichloromethane. According to the measurement, the percentage of the polyethylene on the particle reduces to 33 wt. % and the composite particles contain about 3 wt. % DCP.

DSC thermal tests on the original and polyethylene grafted carbon black were performed between 60 to 135° C. using a Perkin-Elmer Differential Scanning Calorimeter (DSC-7) and 15–25 mg samples. The heating rate was fixed at 5° C./min. and tests were repeated three times for each modified asphalt. The results of this test that was run from 60 to 135° C. are summarized in Table III.

TABLE III

Melting point of the polyethylene grafted on carbon black particles in different medium.

| Sample | PE phase melting point (° C.) |
| --- | --- |
| PE grafted carbon black | 125.93 ± 0.26 |
| PE grafted carbon black + DCP | 126.07 ± 0.25 |
| 3% (PE grafted carbon black + DCP) in Shell 52-34 | 119.92 ± 0.09 |
| 5% (PE) grafted carbon black + DCP) in Shell 52-34 | 119.82 ± 0.12 |

For the polyethylene (PE) grafted carbon black particles, a melting point of about 126° C. is expected. It is worth noting that the melting point of this polymer decreases to 120° C. when added into the asphalt. This means that under usual conditions of cooling, the asphalt controls the size of the crystalline domains of the PE. Repeating the DSC test after a rapid cooling of the modified asphalt sample showed that the main peak of the melting PE drops again to 110° C. This means that if one rapidly cools the pavement, it may result in an asphalt phase which contains PE of smaller crystalline domains which may have better behavior at low and high temperatures.

Stable and high performance paving compositions are provided in accordance with the invention. Both the high and low temperature properties of the compositions are very good and approaching to ideal binder properties. A short mixing time ensures low aging of the base asphaltic material on the addition of the polymer encapsulated particles. At high temperatures, all conventional and rheological tests reveal the positive effects of the polymer encapsulated particles, on the asphalt properties. As it is apparent from the Fraass test and mechanical tests at low temperatures, the paving compositions of the invention are more ductile and better damp the applied stresses. Another important innovation resides in the cross-linking of the polymer encapsulating the solid particles of carbon black that totally stabilizes the obtained morphology at pavement production high temperature.

We claim:

1. A paving composition comprising a mixture of about 90 to 99.5 wt. % of an asphaltic material and about 0.5 to 10 wt. % of solid particles each encapsulated with a cross-linked polymer, the encapsulated particles being uniformly dispersed in said asphaltic material and having a particle-to-polymer weight ratio so as to provide a density match between said encapsulated particles and said asphaltic material.

2. A paving composition as claimed in claim 1, wherein said asphaltic material and said encapsulated particles are present in amounts of about 95 to 97 wt. % and about 3 to 5 wt. %, respectively.

3. A paving composition as claimed in claim 2, wherein said particle-to-polymer weight ratio is about 3:1.

4. A paving composition as claimed in claim 1, wherein said solid particles are selected from the group consisting of particles of carbon black, silicate and kaolin.

5. A paving composition as claimed in claim 4, wherein said solid particles are particles of carbon black having a particle size of about 10μ.

6. A paving composition as claimed in claim 4, wherein said polymer is selected from the group consisting of polyolefins and polydienes.

7. A paving composition as claimed in claim 6, wherein said polymer is a polyolefin selected from the group consisting of polyethylene, polypropylene and polystyrene.

8. A paving composition as claimed in claim 7, wherein said polyolefin is polyethylene.

9. A paving composition as claimed in claim 7, wherein said polyolefin is polyethylene and said solid particles are particles of carbon black.

10. A paving composition as claimed in claim 6, wherein said polymer is a polydiene selected from the group consisting of polybutadiene and polyisoprene.

11. A paving composition as claimed in claim 1, wherein said asphaltic material is selected from the group consisting of straight-reduced asphalts, thermal asphalts and air-blown asphalts.

12. A paving composition as claimed in claim 11, wherein said asphaltic material is a thermal asphalt.

13. A paving composition as claimed in claim 1, wherein said encapsulated particles are obtained by catalytically grafting said polymer on said solid particles and thereafter cross-linking said polymer.

14. A paving composition as claimed in claim 13, wherein said encapsulated particles are obtained by catalytically synthesizing said polymer onto said solid particles and thereafter treating the encapsulated particles with a cross-linking agent to cause cross-linking of said polymer.

15. A paving composition as claimed in claim 14, wherein said cross-linking agent is dicumyl peroxide.

\* \* \* \* \*